Jan. 19, 1954

S. H. RING 2,666,421

INTERNAL-COMBUSTION ENGINE WITH
VARIABLE COMBUSTION CHAMBER

Filed Aug. 7, 1950

Inventor
Sidney H. Ring
By
Attorney.

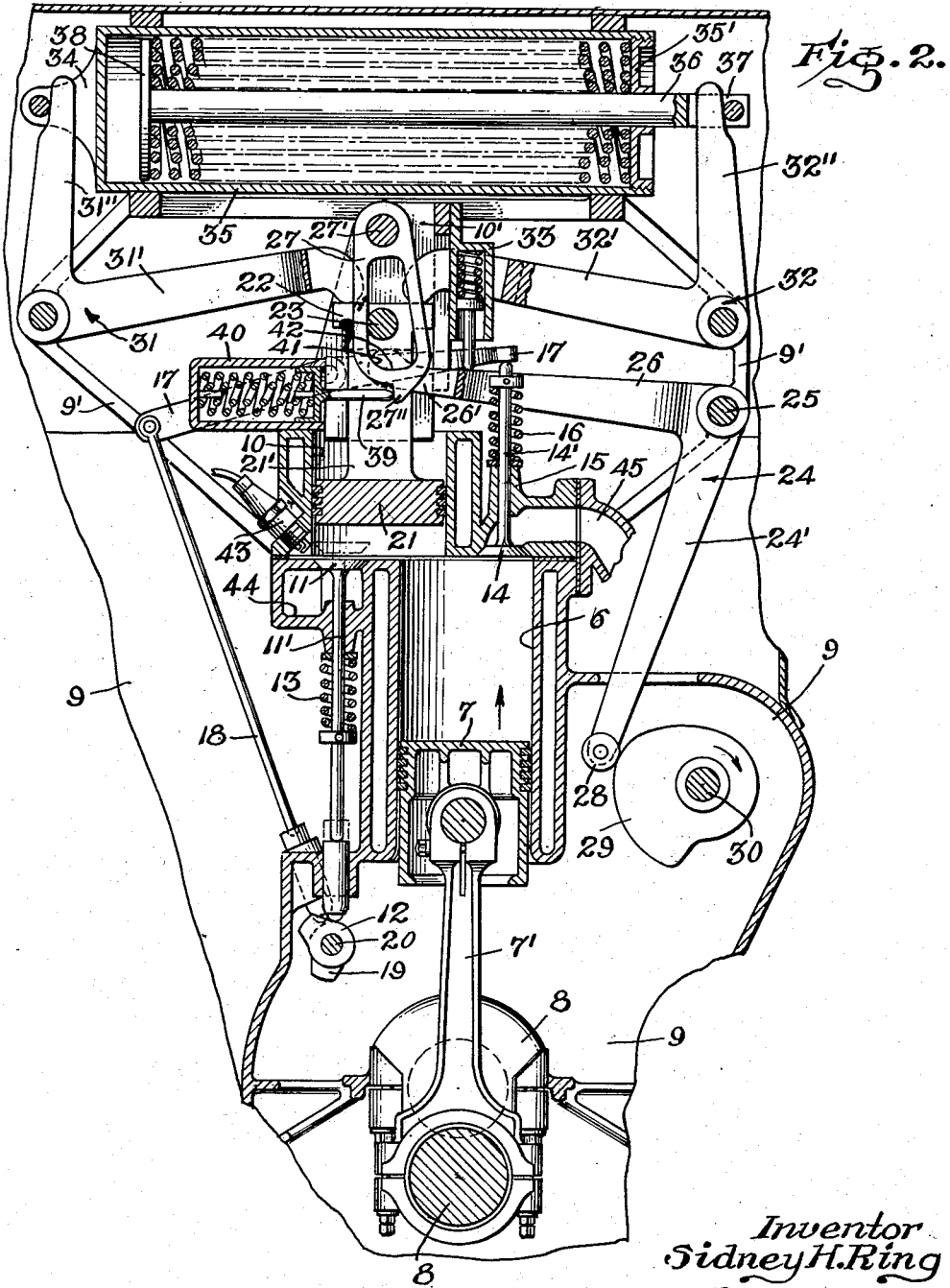

Jan. 19, 1954
S. H. RING
2,666,421
INTERNAL-COMBUSTION ENGINE WITH
VARIABLE COMBUSTION CHAMBER
Filed Aug. 7, 1950
4 Sheets-Sheet 3
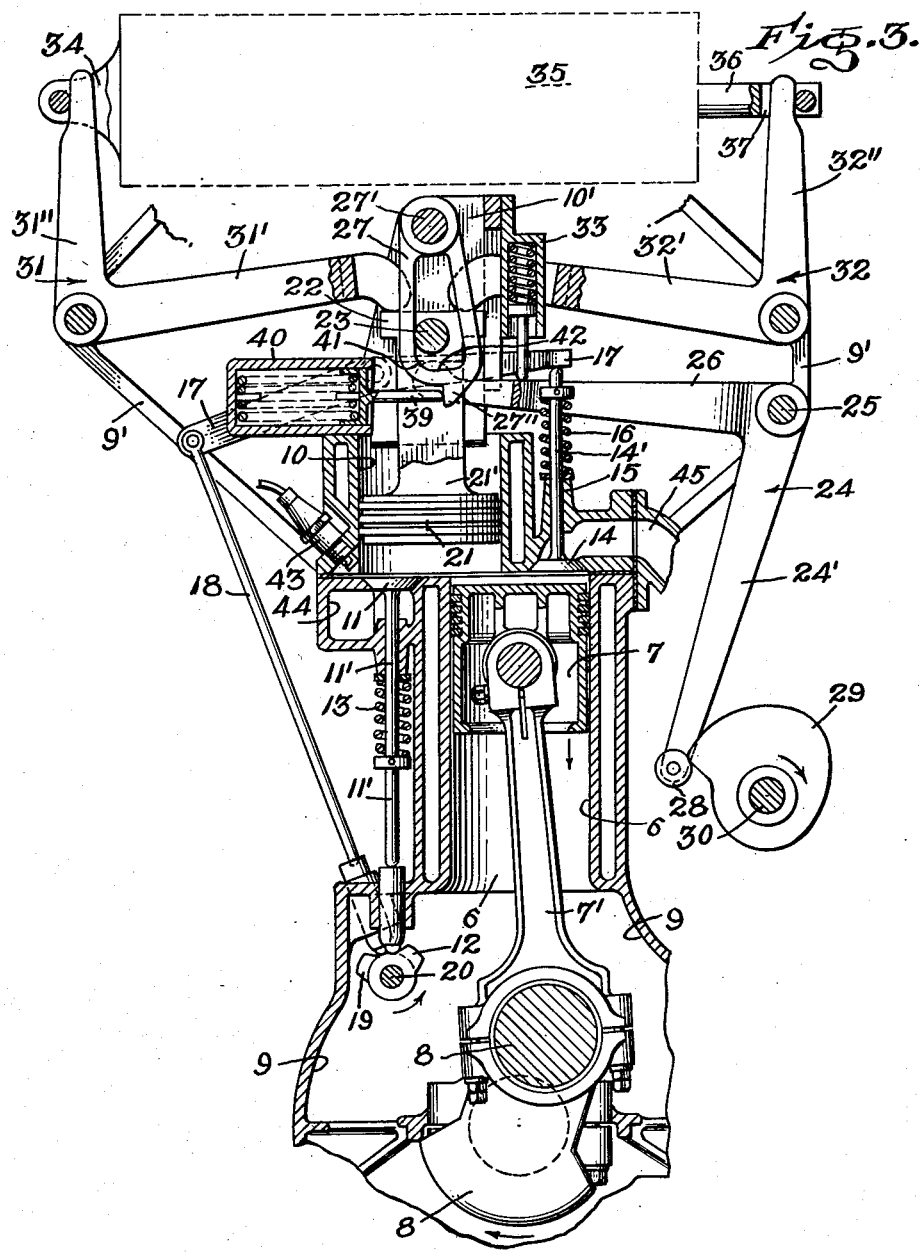
Inventor
Sidney H. Ring
By
Attorney.

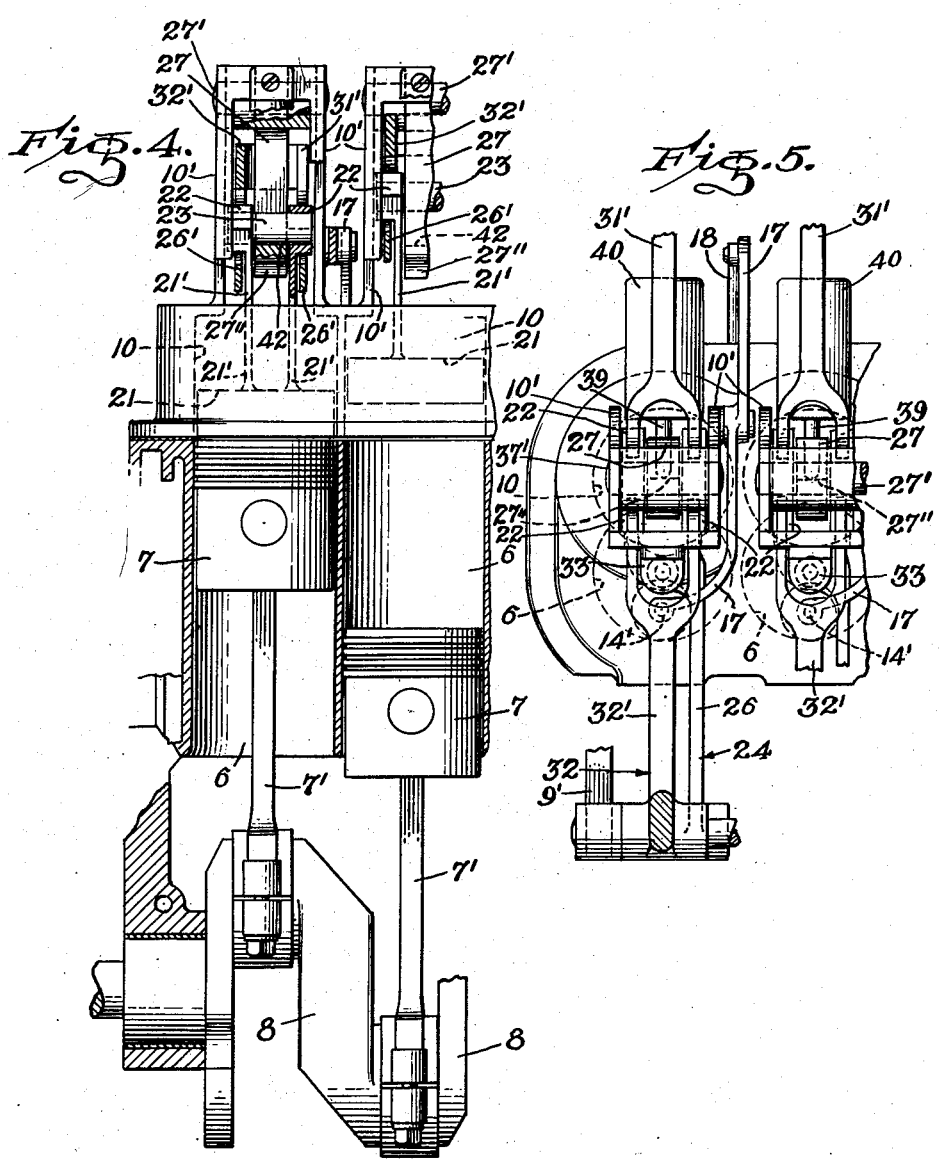

Patented Jan. 19, 1954

2,666,421

UNITED STATES PATENT OFFICE 2,666,421

INTERNAL-COMBUSTION ENGINE WITH VARIABLE COMBUSTION CHAMBER

Sidney H. Ring, Portland, Oreg.

Application August 7, 1950, Serial No. 178,135

2 Claims. (Cl. 123—78)

This invention relates to internal combustion engines with variable combustion chambers, and it has among its salient objects:

To provide in connection with an internal combustion engine and its regular power cylinder, an auxiliary cylinder and piston, cooperatively associated with said power cylinder, and communicating therewith, with its piston operable to increase and diminish the size of the combustion chamber relative to said power cylinder;

To provide in connection with a power cylinder and its piston, an auxiliary cylinder and piston, in lateral overlapping relationship at their adjacent ends, to provide communication between said power cylinder and said auxiliary cylinder at the overlapping parts of said adjacent ends of said cylinders;

To provide in connection with a power cylinder and an auxiliary cylinder, having their adjacent, or contiguous ends, in partial overlapping relationship, an intake control valve for said auxiliary cylinder and an exhaust control valve for said power cylinder, said control valves being positioned in the non-overlapping portions of said cylinders, respectively;

To provide in an engine of the character referred to, in combination with the power cylinder thereof and the piston therein, an auxiliary cylinder in communication with said power cylinder, the piston of said power cylinder, and the piston of said auxiliary cylinder being movable toward and from each other, along parallel axes, and in partial overlapping relationship as they come together, whereby to form a combustion chamber between the adjacent ends of said cylinders and between said pistons therein;

To provide in combination with the power cylinder of a combustion engine and the piston therein, an auxiliary cylinder having an open end adjacent an open end of said power cylinder and in partial lateral overlapping relationship therewith, with a piston in said auxiliary cylinder, movable toward and from the piston in said power cylinder, and with spring, cam and lever mechanisms for moving and controlling the movements of the piston in said auxiliary cylinder with relation to the movements of the power piston in said power cylinder to vary the size of the combustion chamber therebetween;

Other objects and advantages of the invention will appear from a more detailed description thereof, taken with the accompanying four sheets of drawings, which I will now describe:

Figure 2 is a similar view showing the two pistons at the opposite ends of their strokes, and when a fresh charge of fuel has been drawn into the cylinders, between said pistons;

Figure 3 is a similar view showing the power piston in its upper position, with the auxiliary piston about to be moved downwardly, with compression force, as its lifting mechanism is released and its moving springs are permitted to function;

Figure 4 is a fragmentary sectional view, on line 4—4 of Fig. 1, showing two power cylinders, with pistons therein, and also showing the auxiliary cylinders and their pistons in light broken lines, with parts in section; and Figure 5 is a fragmentary plan view, looking down from the line 5—5 on Fig. 1.

Figure 1:
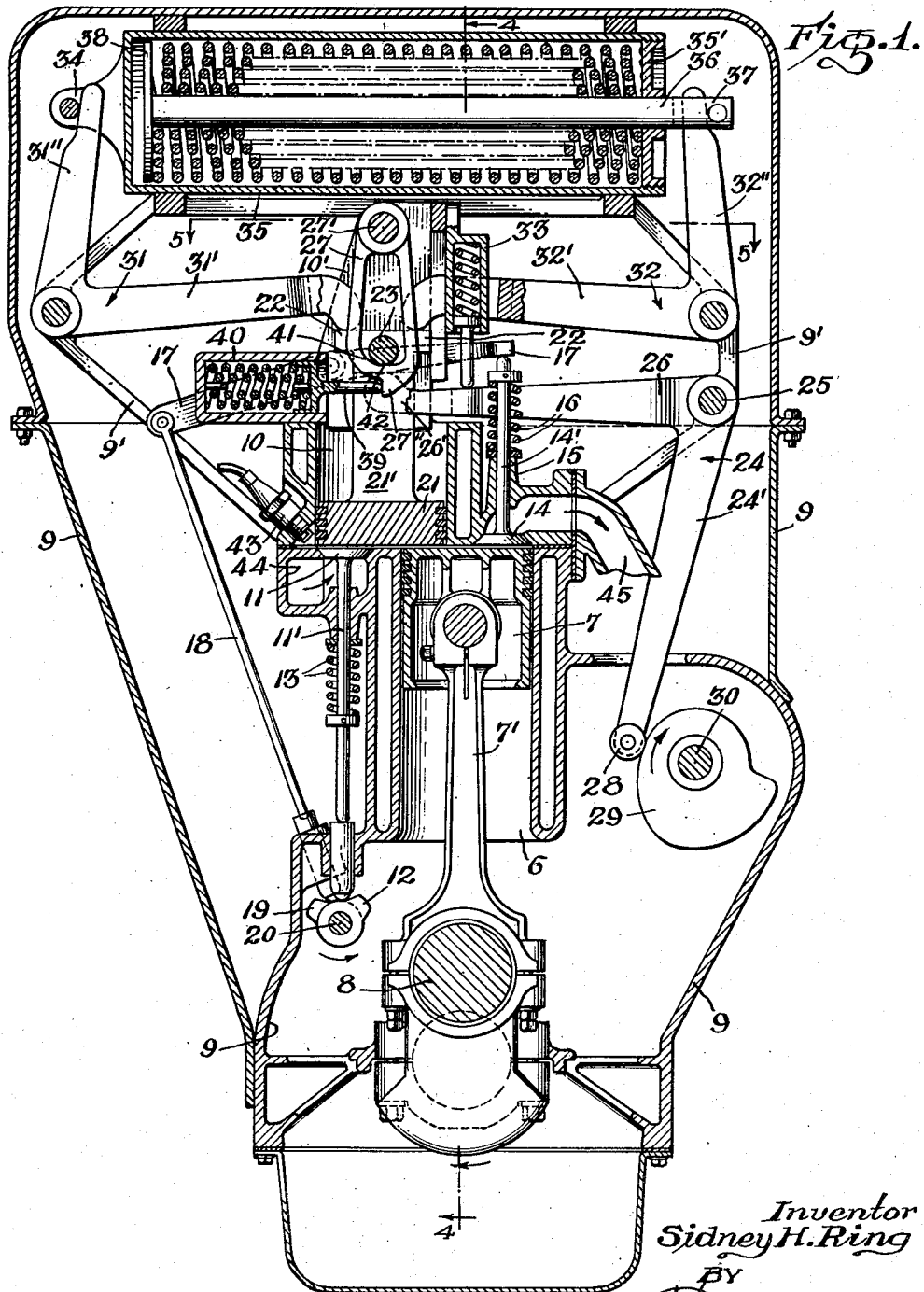
Figure 1 is a vertical sectional view through an internal combustion engine embodying my invention, with the work piston and the auxiliary piston shown together, following a complete scavenging of the burnt gases from the cylinders.

Referring now in detail to the drawings, two regular power cylinders are designated 6, 6, with their pistons 7, 7, therein, connected by piston rods 7', 7' to cranks 8, 8, in a crank case, designated as a whole 9. This mechanism can be of any desired design or type.

The upper ends of said power cylinders 6, 6, are open.

Formed in the cylinder block or head, above said power cylinders, are two auxiliary cylinders designated 10, 10, having parallel axes with the axes of said power cylinders, but laterally positioned, as shown in Figs. 1, 2 and 3, so as to be in partial overlapping relationship at their contiguous open ends, as clearly shown in said figures. An inlet control valve 11 is positioned in the non-overlapping end of each power cylinder, with its valve stem 11' extended down into the crank case 9, as here shown, to be intermittently raised by an operating cam 12, as seen in Figs. 1, 2 and 3. A coiled spring 13 on said valve stem 11' operates to normally hold said inlet valve closed.

An exhaust valve control valve 14, is positioned at the opposite side, in the non-overlapping end of said auxiliary cylinder, with its valve stem 14' extended upwardly through bearing portions of the cylinder block, as at 15, and provided with a coiled spring 16 to normally hold it closed, in the manner clearly shown in said Figs. 1, 2 and 3. Said exhaust valve is intermittently opened by means of a rocker arm 17, bearing on the upper end of said valve stem 14', and having its opposite end connected by means of a thrust rod 18, to be operated by a cam 19, on the same shaft 20 with cam 12.

The mechanism so far described is generally known, except that the provision of an auxiliary cylinder and piston, in partial overlapping relationship at their contiguous ends is believed to be new.

Operable in said auxiliary cylinders 10, 10, are two pistons, 21, 21, each having two spaced extensions, as 21', 21', extended upwardly and provided at their upper ends with enlarged bearing portions, as 22, 22, to receive therein a short shaft or pin 23, Fig. 4, and shown extended through said spaced extensions 21', 21', as seen in section in Figs. 1, 2 and 3.

As one means of lifting and lowering said auxiliary pistons 21, I have shown a bellcrank 24, pivotally supported, as at 25, in parts 9' of the cylinder block frame, the housing being designated as a whole 9, and having the end of its upper arm 26 bifurcated, as at 26', around a yoke 27, again referred to. A lower arm 24' of said bellcrank is provided with a cam roller 28, bearing on a cam 29, on a drive shaft 30. This bellcrank operates by reason of its contour to intermittently raise the auxiliary piston 21 by engaging the undersides of the bearing portions 22, as said bellcrank is operated by said cam 29, which is of special contour, as clearly shown.

Pivotally mounted in the upper part of the cylinder block frame are two bellcranks, 31 and 32, the lower arms 31' and 32' thereof being bifurcated at their ends to straddle the yoke 27, and to bear down upon said bearing portions 22, 22, of the auxiliary pistons; the arm 32' being bifurcated with a longer fork to also straddle a spring housing 33.

The upper or vertical arms 31'' and 32'' of the bellcranks 31 and 32 are held, respectively, between spaced lug portions 34 on the end of a spring housing 35, and in the end of a piston rod 36, as at 37.

This spring housing 35, it will be seen, incloses four coiled springs which operate against one end 35' of the housing 35, and at their other ends, against a plunger head 38, within the housing 35, whereby to normally press the auxiliary piston 21 down to compress the fuel charge in the cylinders between the two pistons, and to the position shown in Fig. 1.

Referring now to the yoke 27, it is pivotally suspended from a shaft 27', having its bearings in the upstanding bearing or supporting members, as 10', above the auxiliary cylinders. Said yoke has its open loop over the short shaft or pin 23, carried by the two bearing portions 22 on the upper ends of the extensions of the auxiliary piston 21.

The lower end of said yoke 27 is provided with an extension toe 27'' against which bears a spring loaded plunger rod 39, in a spring housing 40. This plunger rod 39 holds the yoke yieldingly in engagement with the short shaft or pin 23; and as said auxiliary piston is about to reach its lowest position, the curved bottom of said loop, at 41, bearing on said shaft or pin 23, cushions the downward movement of said auxiliary piston and prevents it from striking the top of the power cylinder too hard, or at all.

A spark plug 43 is shown set in the cylinder block at the juncture of the upper end of the power cylinder 6, and the auxiliary cylinder 10, as will be clear from Figs. 1, 2 and 3.

An intake manifold or chamber for fuel supply is shown and designated 44 to include the intake valve 11, and an exhaust manifold is designated 45, at the opposite side of the cylinders, and includes the exhaust valve 14, as clearly shown in Figs. 1, 2 and 3.

I do not, of course, limit the invention to the details of construction and arrangement here shown for explanatory purposes, knowing that many changes in said details will probably be made. In place of the usual cylinder head, I have provided an auxiliary cylinder block or body, mounted on the regular cylinder block, as clearly indicated, with pistons operating therein to make possible variable sizes of combustion chambers, according to the positions of said auxiliary pistons, as before referred to.

In the operation of the invention, it will be understood that the lifting of the auxiliary piston 21, in the auxiliary cylinder 10, will be timed with the operation of the power piston 7, and that as the power piston 7 is moved downwardly on a fuel intake stroke, said auxiliary piston 21 will also be moved upwardly by the cam 29 and the bellcrank 24, thus forming a low compression chamber between said pistons and increasing the intake of fuel.

As said power piston 7 is moved upwardly throughout the compression stroke, the auxiliary piston 21 remains stationary, thus keeping the compression chamber constant and the compression pressure well below the self-igniting point.

When the power piston 7 passes top dead center, as shown in Fig. 3, the cam 29 releases the lifting bellcrank 24, permitting the spring-actuated bellcranks 31 and 32 to force the auxiliary piston downwardly, decreasing the compression space and supercompressing the charge. The charge is ignited at the proper time and the power stroke is started.

When the super-compressed charge is exploded the resulting intolerably high pressure is relieved by the auxiliary piston leaving arm 26 and moving upwardly against the spring pressure until the said spring pressure and explosion pressure are equalized, whereupon the auxiliary piston 21 follows the power piston downwardly, keeping a pressure on the power piston equal to the spring pressure until the auxiliary piston reaches its bottom limit as shown in Fig. 1, leaving the gas pressure to actuate the power piston naturally until the exhaust valve 14 is opened by cam 19, thrust rod 18 and rocker arm 17.

Since the auxiliary piston 21 remains stationary at the position shown in Fig. 1, during the latter part of the power stroke and throughout the exhaust stroke, during which it contacts arm 26 again, the power piston accomplishes almost perfect scavenging of the cylinders as it reaches the top.

Thus I have provided what I believe to be an entirely new internal combustion engine in which a power cylinder and an auxiliary cylinder, with their pistons operable therein, in such synchronism relative to each other, that a variable combustion chamber is made possible, and also a greater intake of fuel is made possible by two pistons moving apart during the intake of fuel, and also a greater compression of fuel is made possible by two pistons moving toward each other, in the manner described, and while I have shown and described one practical embodiment of the invention, I do not limit the invention to the showing made for explanatory purposes, except as I may be limited by the hereto appended claims.

I claim:

1. In an internal combustion engine of the character referred to, the combination with the power cylinder and piston, auxiliary cylinder and piston, spark plug and valve means therefor, of spring means for operating said auxiliary piston on the compression stroke in cooperation with said power piston to compress the fuel charge between said pistons as they come together, said operating means including a spring-loaded connection with said auxiliary piston operating constantly to move it toward said power piston, cam-operated means for intermittently raising it against the tension of said spring and for releasing said auxiliary piston to leave it free for a compression stroke under the force of said spring.

2. In an internal combustion engine, the combination with a power cylinder with power piston therein, an auxiliary cylinder in communication with said power cylinder, with auxiliary piston therein, with spark plug and valve means therefor, of a cam operated bellcrank for moving said auxiliary piston away from said power piston during an intake stroke of said power piston sufficiently to form a low compression chamber when compression stroke is completed, and means on said cam for allowing said auxiliary piston to be instantly released from its cam control, and a spring-loaded connection therewith to move it toward the power piston at the start of the power stroke, to supercompress a charge to a predetermined compression ratio.

SIDNEY H. RING.

References Cited in the file of this patent

UNITED STATES PATENTS

| Number | Name | Date |
|---|---|---|
| Re.18,595 | Wilson | Sept. 13, 1932 |
| 1,557,710 | Lennon | Oct. 20, 1925 |
| 1,574,062 | Boehmer | Feb. 23, 1926 |
| 1,574,574 | Hale | Feb. 23, 1926 |
| 1,654,701 | Powell | Jan. 3, 1928 |
| 1,816,402 | Ruud | July 28, 1931 |
| 1,819,897 | Johnson | Aug. 18, 1931 |
| 2,119,226 | Ernst | May 31, 1938 |
| 2,382,362 | Weinreb | Aug. 14, 1945 |
| 2,419,450 | Howard | Apr. 22, 1947 |

FOREIGN PATENTS

| Number | Country | Date |
|---|---|---|
| 177,025 | Switzerland | Aug. 1, 1935 |